United States Patent
Gur

(10) Patent No.: US 8,706,441 B2
(45) Date of Patent: Apr. 22, 2014

(54) SYSTEM AND METHOD FOR EVALUATING AN AREA

(75) Inventor: Joshua Gur, Jerusalem (IL)

(73) Assignee: Israel Aerospace Industries Ltd., Lod (IL)

(*) Notice: Subject to any disclaimer, the term of this patent is extended or adjusted under 35 U.S.C. 154(b) by 840 days.

(21) Appl. No.: 12/841,588

(22) Filed: Jul. 22, 2010

(65) Prior Publication Data
US 2011/0040521 A1  Feb. 17, 2011

Related U.S. Application Data

(63) Continuation of application No. PCT/IL2009/000080, filed on Jan. 21, 2009.

(30) Foreign Application Priority Data

Jan. 24, 2008  (IL) .......................................... 189007

(51) Int. Cl.
 *G01C 9/00* (2006.01)
 *G01N 21/86* (2006.01)
(52) U.S. Cl.
 USPC ..................................... 702/150; 250/559.43
(58) Field of Classification Search
 USPC ................ 702/150, 127, 151–153, 155–159, 702/188–189; 356/3, 457, 496–498, 508, 356/614, 623, 628–629, 634–637, 356/639–640; 250/559.04–559.06, 559.19, 250/559.2, 559.26, 559.29, 559.39, 559.4, 250/559.42–559.43, 559.45–559.46
See application file for complete search history.

(56) References Cited

U.S. PATENT DOCUMENTS

| 5,539,199 A | 7/1996 | Ruckh et al. |
| 7,453,080 B2 * | 11/2008 | Gur ............................ 250/559.4 |
| 2006/0015301 A1 | 1/2006 | Faulkner et al. |

FOREIGN PATENT DOCUMENTS

WO   WO 2006/056997 A1   6/2006

* cited by examiner

*Primary Examiner* — Toan Le
(74) *Attorney, Agent, or Firm* — Oliff PLC

(57) ABSTRACT

There are provided a method of evaluating an area located behind a structure and a system thereof. The system includes: at least one source of electro-magnetic radiation adapted to illuminate a structure portion and to illuminate a area portion via openings formed between elements of the structure while a relative movement is introduced between the structure and the system; multiple detectors adapted to detect electro-magnetic radiation returned from the structure portion and from the area portion; a computing unit adapted to: (i) generate, in response to the detected electro-magnetic radiation, a simplified representation the area portion; and (ii) evaluate the area portion in response to a relationship between the simplified representation of the area portion and a reference simplified representation of the area portion.

19 Claims, 13 Drawing Sheets

SYSTEM AND METHOD FOR EVALUATING AN AREA

FIELD OF THE INVENTION

The invention related to systems for evaluating an area that is located behind a structure as well as the structure and especially to systems and methods for evaluating alterations or deviations from expected area characteristics.

BACKGROUND OF THE INVENTION

Long structures such as long fences restrict of at complicate an access to an area located behind these long structures. This area is typically monitored by manned patrols that travel along one side of the long structure while viewing the area position on the other side of the long structure.

Manned patrols are relatively costly, are of questionable reliability. In hostile environments manned patrols are associated with substantial risks. Replacing manned patrols by unmanned patrols systems can be beneficial if various technological obstacles are overcome.

There is a growing need to provide efficient systems and methods for evaluating an area located behind a long structure.

SUMMARY OF THE INVENTION

A method for evaluating an area located behind a structure, the method includes: illuminating, by at least one source of electro-magnetic radiation, a structure portion and a area portion via openings formed between elements of the structure while a relative movement is introduced between the structure and the method; detecting, during the relative movement, by multiple detectors, electro-magnetic radiation returned from the structure portion and from the area portion; generating, during the relative movement, in response to the detected electro-magnetic radiation, a simplified representation the area portion; and evaluating, during the relative movement, the area portion in response to a relationship between the simplified representation of the area portion and a reference simplified representation of the area portion.

A system for evaluating an area located behind a structure, the system includes: at least one source of electro-magnetic radiation adapted to illuminate a structure portion and to illuminate a area portion via openings formed between elements of the structure while a relative movement is introduced between the structure and the system; multiple detectors adapted to detect, during the relative movement, electro-magnetic radiation returned from the structure portion and from the area portion; a computing unit adapted to: (i) generate, during the relative movement, in response to the detected electro-magnetic radiation, a simplified representation the area portion; and (ii) evaluate, during the relative movement, the area portion in response to a relationship between the simplified representation of the area portion and a reference simplified representation of the area portion.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
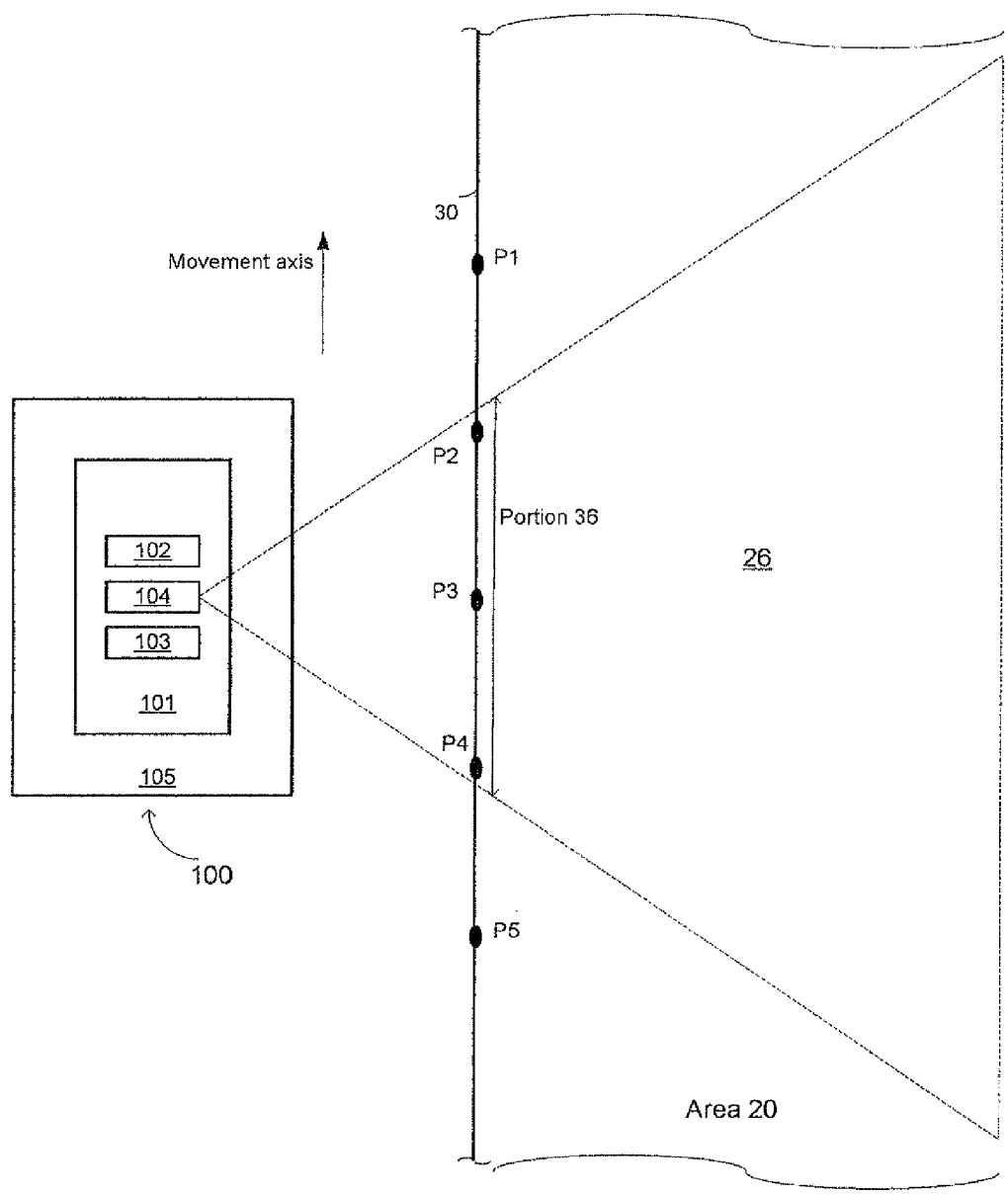
FIG. 1 is a schematic illustration of a system, a structure and an area, according to an embodiment of the invention.

The present invention provides for a system and method for evaluating an area and especially to systems and methods for evaluating alterations or deviations from expected area characteristics. These expected area characteristics typically define the surface of the area.

The alterations of deviations can result from a removal of objects, an addition of objects, people that enter the area, and the like.

Conveniently, real time evaluation of the area is facilitated by utilizing simplified representations of portions of area and especially by utilizing simplified representations of sub-portions of the area. The simplified representations are relatively small and thus can be processed in real time. Simplified representations of sub-portions of the area can represent very narrow stripes of the area. These simplified representations can provide a relatively detailed description of the area and can represent area elements of few millimeters wide.

The simplified representation can be a three dimensional cloud of points or a polygon map of an area or an area portion and can be easily retrieved by using the exact location of the system.

According to an embodiment of the invention the area evaluation method and system illuminate a structure and the area the is behind (on the other side of) the structure via openings in the structure. The structure and the evaluated area can be very long. Even a simplified representation of very long areas can be very large and hard to process, but by processing representations of area portions and especially small area-sub-portions the processing is greatly simplified and can be executed in real time.

The structure includes multiple elements that are ideally arranged in a periodical manner. Deviations from the periodical arrangement can be measured by the system and method, especially by scanning the structure along two scanning directions (for example—along a substantially vertical scanning direction and along a substantially horizontal direction). It is noted that the scanning of the structure as well as scanning the area behind the structure can provide information representative of the orientation (pitch, yaw and roll) of the system.

Conveniently, the structure is a diluted object—it includes multiple elements as well as openings that are defined between these elements, whereas the oversize of the openings exceeds and even well exceeds the size of the elements. Diluted objects can be fences, fabrics, woven textiles, honeycomb-shape structures, grid-like structures, perforated structures and the like. The openings can be one millimeters or more.

For simplicity of explanation, the principles of the present invention will be disclosed in the following, mainly with respect to detection of alterations in areas located behind fences, and more specifically fences of the type used to border and secure an area (e.g. a wired fence, a welded wire fence, a barbed fence, a fence having wires supported by spaced apart posts, and more). Such fences are typically construed by horizontally stretched wires supported by vertically, spaced apart posts. For some applications, the operational considerations require a resolution in the order of centimeters and even millimeters in detection and localization of alterations of an area located behind the fence, to be achieved by relatively cheap and sustainable hardware. This requirement is practically impossible to fulfill, using standard and known image processing techniques and hardware.

Although the following description refers to fences it is noted that the illustrated methods and systems can also be applied to areas that include various structural discontinuities such as building corners, wall edges, windows, doors, corridors and the like.

FIG. 1 is a schematic illustration of system 10 according to an embodiment of the invention.

System 100 evaluates area 20 located behind fence 30. A fence portion 36 may be included within a field of view of system 10, but this is not necessarily so. System 100 propagates along fence 30 on one side of fence 30 while evaluating an area that is located at the other side of fence 30. FIG. 1 illustrates portion 26 of an area 20 (also referred to as area portion 26) that is located behind portion 36 of fence 30 (also referred to as fence portion 36). Portion 36 can be few meters long and many meters (even few hundred meters) deep—depending upon its topography and the orientation of system 100 in response to that portion.

Fence portion 110 includes three vertical posts ($P_2$-$P_4$) that support multiple horizontal wire lines. Post $P_2$ is preceded by post $P_1$ and post $P_4$ is followed by post $P_5$. It is noted that fence 30 can include many (even thousands or more) of posts. It can represent also wall edges and the like.

In the embodiment shown in FIG. 1, system 100 includes moving platform 105 (e.g. a jeep, an unmanned automated vehicle, etc.) and sub-system 101 mounted onboard. System 100 travels along fence 30 and scans fence portion 36 as well as scans area portion 26.

In the exemplary and non-limiting embodiment illustrated in FIG. 1, fence portion 36 is scanned substantially simultaneously by two detection units 102 and 103 (additional detection units may also be employed, as will be detailed further below) while area portion 36 is scanned (via openings in structure portion 36) by a third detection unit 104. A detection unit conveniently includes a source of electro-magnetic radiation and a detector that detects electro-magnetic radiation.

The information gathered by first and second detection units is processed to determine an exact location of system 10 as well as its orientation (pitch, yaw and roll). Information gathered by third detection unit 104 (as well as the exact location of system 10 and its orientation) provide a simplified representation of area portion 36 or of sub-portions of area 20. The simplified representation is compared with a reference representations and differences between these representations can indicate that the area has changed.

As will be discussed further below, a relatively small quantity of data is needed to be stored and retrieved in order to compare the updated state of the area with a reference simplified representation of the area. According to other embodiments of the invention, various verification rules are applied, e.g. by comparing the occurrence data of certain segments (e.g. adjacent segments of the fence) to enhance credibility of the system. These outcomes are very useful e.g. for real-time operational needs. It is noted that comparing adjacent areas may enhance the detection range even for relatively weak signals by depth comparison.

Figure 2:
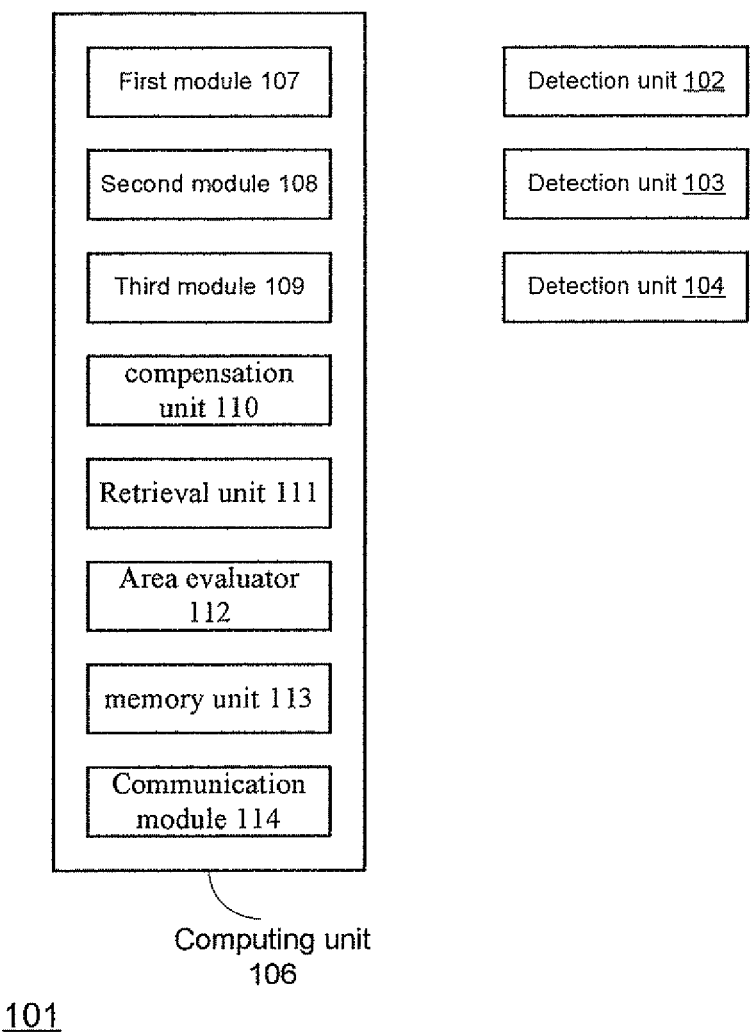
FIG. 2 is another schematic illustration of a sub-system of the system of FIG. 1, according to an embodiment of the invention.

FIG. 2 is a schematic illustration of sub-system 101 according to an embodiment of the invention. Sub-system 101 is mounted onboard a moving platform which is not shown in FIG. 2.

Sub-system 101 includes three detection units 102, 103 and 104, connected to computing unit 106. Conveniently, computing unit 106 is also connected to display unit 114, and optionally a communication unit (not shown in FIG. 2) for transmitting (or receiving) information from (or to) sub-system 101.

Conveniently, computing unit 106 includes first and second modules 107 and 108, third module 109, compensation unit 110, retrieval module 111, area evaluator 112, memory unit 113 and communication module 114.

First and second modules 107 and 108 are adapted to process data received from detection units 102 and 103 in order to determine the exact location (X, Y and optionally Z) of sub-system 101 as well as the orientation (yaw, pitch and roll) of sub-system 101 with respect to the structure. Third module 109 is adapted to process data received from third detection unit 104 and to generate a simplified representation of area portions or area sub-portions. Retrieval module 111 is adapted to retrieve reference simplified representations of area portions (or of areas sub-portions). Compensation unit 110 compensates for difference between an acquisition process of the reference simplified representations of area portions (or area sub-portions) and between an acquisition process of the simplified representations of area portions (or area sub-portions). These differences can represent differences in measurement points, differences in orientation, as well as differences between various ambient parameters such as light intensity, temperature, visibility and the like. The compensation can include rotating a simplified representation of an area portion (or area sub-portion), magnifying or de-magnifying a simplified representation and the like. The compensation process also can take into account various parameters such as a distance related attenuation (proportional to the square of the distance between system 100 and the illuminated object), illumination radiation power differences (including temporal illumination power fluctuations), and the like.

According to the exemplified embodiment of the invention, first and second detection units 102 and 103 are laser scanners, each having its own laser source (not shown in FIG. 2) to illuminate a portion of the fence. The laser source could be a commercially available laser, operating in the near IR range or less. The wavelength of the laser affects the spackle reflection coming from the scattering elements (when coherent illumination is used). The wavelength of the radiation provided by the laser should be substantially in the order of the irregularity that characterizes the scattering element material, or less. The third detection unit 140 includes a pulsed laser. The laser can generate coherent pulses or non-coherent pulses.

It is noted that each module or unit can include hardware components, software components, firmware and/or a combination thereof. It is noted that the various components and/or units can be integrated or separated from each other in various manners.

Detection units 102 and 103 are adapted to collect electromagnetic radiation returned (by reflection and/or scattering) from the elements of the fence. Detection units 102 and 103 operate along different collection directions. For example, detection unit 102 operates along a direction parallel to the movement direction of the vehicle (e.g. a substantially horizontal collection direction) whereas detection unit 103 operates along a perpendicular direction (e.g. a substantially vertical collection direction). Put differently, detection unit 102 is adapted to scan horizontal wires and detection unit 103 is adapted to scan posts. It is noted that the horizontal scanning conveniently includes scanning the fence along substantially parallel horizontal scan lines. This can be done by introducing a vertical movement (of laser source of detection unit 102).

Conveniently, sub-system 102 can also utilize additional information such as GPS data, vehicle movement information, information from other systems, fence expected shape information, and the like, in order to determine its location and to determine its location with very high resolution. It is noted that system 100 can also function properly without additional information such as GPS data.

Figure 3:
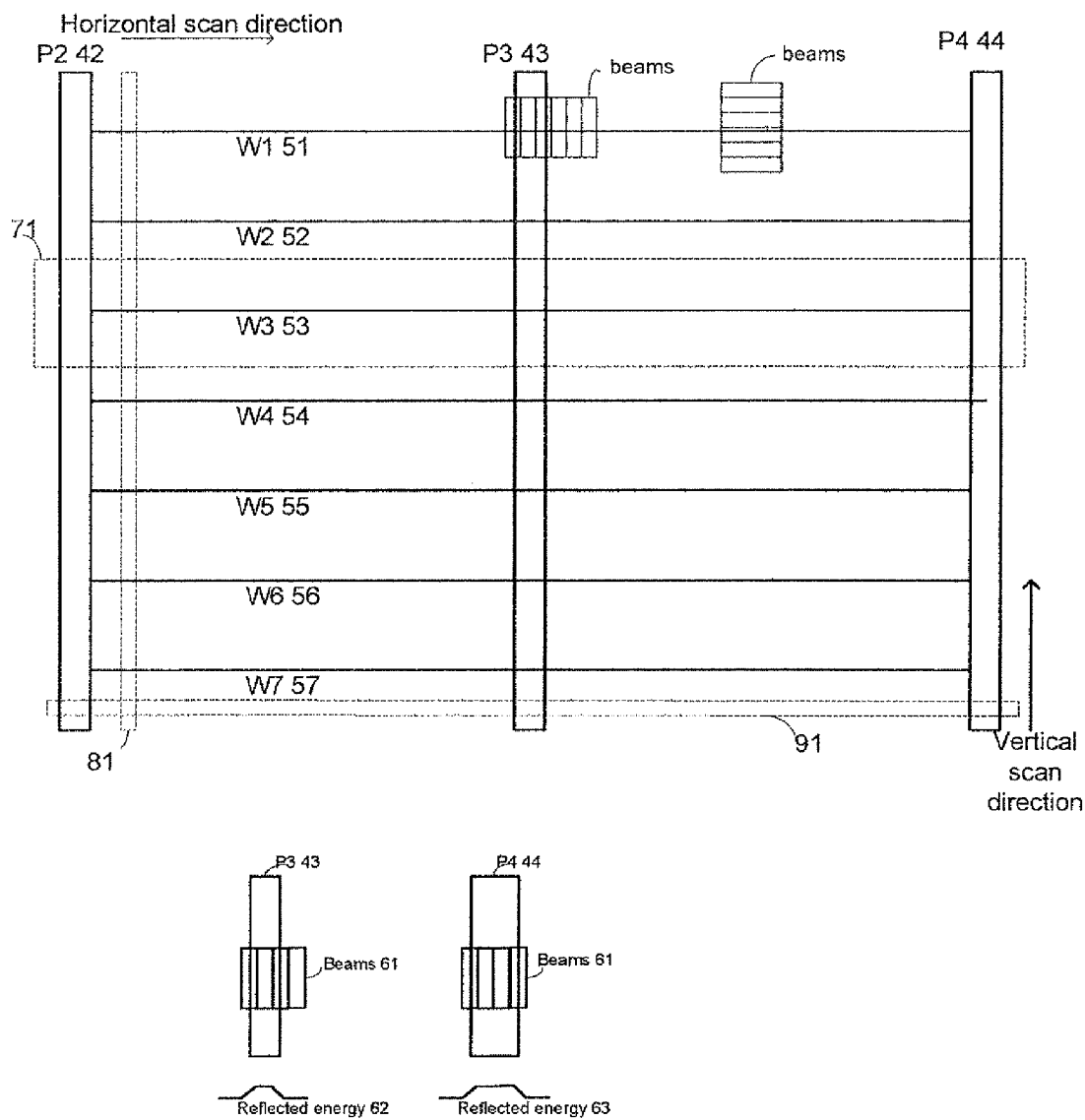
FIG. 3 illustrates a fence portion as well as three electro-magnetic radiation beams, according to an embodiment of the invention.
Figure 4:
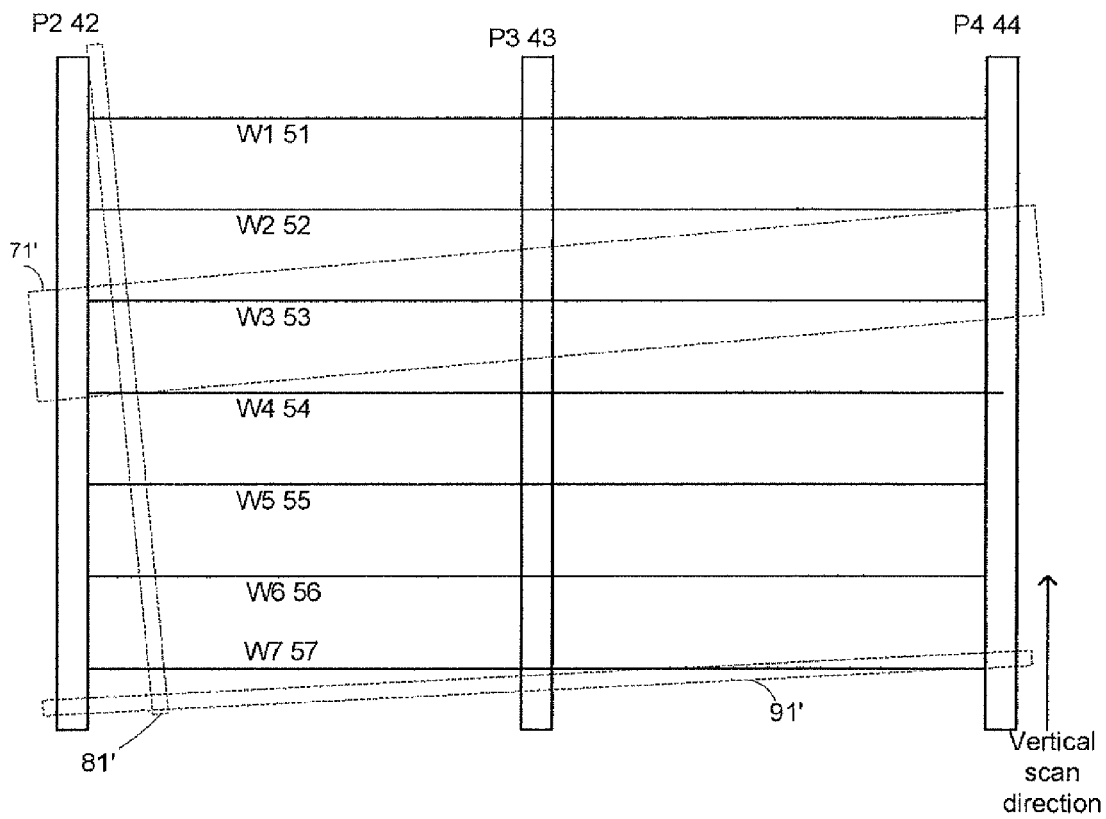
FIG. 4 illustrates a fence portion as well as three cross sections of three shifted and rotated electro-magnetic radiation beams, according to an embodiment of the invention.

FIG. 3 illustrates sample scanning patterns according to an embodiment of the invention. First detection unit 102 horizontally scans fence 30 by a high and narrow radiation beam 81. Second detection unit 103 vertically scans fence 30 by a short and wide radiation beam 91. Third detection unit 104 vertically scans area by an elongated (rectangular shaped) beam 71 that is vertically larger than radiation beam 81. Third detection unit 104 conveniently includes a coherent pulsating laser that generates high repetition rate pulses. It is noted that non-coherent laser can also be used. The laser can be coherent in respect to small features and not in respect to large features. It is note that while FIG. 3 illustrates an orientation (pitch, yaw and roll) free scenario, that the orientation of system 100 can cause first till third detection units 102-104 to scan the fence (first and second detection units) and the objects behind the fence by beams that are not parallel to posts P2-P4 or to wires W1-W7 51-57. This is illustrated by radiation beams 71', 81' and 91' of FIG. 4. System 100 can calculate the orientation of system 100 in relation to fence portion 36 by comparing the expected structure of the portion to the readings of first and second detection units 102 and 103. By performing multiple measurements of the various elements of fence portion 36, the accuracy of the orientation determination can be improved. It is noted that each pole can be illuminated by multiple horizontal beams and that each pole can be illuminated by multiple vertical beams.

It is noted that the location of a pole as well as the angle to that pole can be evaluated given multiple beams that at least partially are reflected from that pole. Assuming that the shape of the pole is known, the number of beams that are at least partially reflected from the pole can indicate the angle between the system and the pole. Assuming that the pole is square then the number of beams that are at least partially reflected from the pole when the system is perpendicular to a side of the pole is smaller than the number of beams that are at least partially reflected from the pole when the system is oriented at about forty five degrees to that side of the pole. This relationship can be used to generate a calibration graph that can improve the accuracy of the angular measurement between the system and the pole. It is noted that the overall energy reflected from the pole (and received by the system) can further assist in determining the angle. This is illustrated in FIG. 3—energy reflected from pole P3 43 differs from the energy reflected from pole P4 44 due to the differences between the spatial relationships of system P3 43 and P4 44.

It is noted that the pole is an example of a reflecting object.

FIG. 3 also illustrates some beams that illustrate the vertical and horizontal scanning. It is noted that the scanning can deviate from purely horizontal (or purely vertical) scanning without departing from the scope of the invention.

Conveniently, information generated by one detection unit is integrated with information gathered by the other one or more detection units According to an embodiment of the invention, the operation of the system 100 is fully automated. According to other embodiments, an operator is involved with various aspects of operations, e.g. assessing indications of possible alterations, reviewing external information, responding to detected alterations, and more.

In the embodiment illustrated in FIG. 2, computing unit 206 serves all components of the detection system. It should be understood that the invention is not limited by the illustrated configuration and many others are possible, without departing from the scope of the invention, with necessary modifications.

In the above description, the relative movement between the detection system and the fence is implemented by mounting the system onboard a moving platform (element 105 in FIG. 1). According to an embodiment of the invention, platform 105 is an all-terrain vehicle. According to another embodiment, the platform 105 is further equipped with obstacle-avoidance and self-guidance systems, and more. It should be understood that the invention is not limited by the illustrated configuration and many others are possible within the scope of the present application. For example, relative movement between the detection system and the detected structure may be provided by moving the structure with respect to the detection system.

Figure 5:
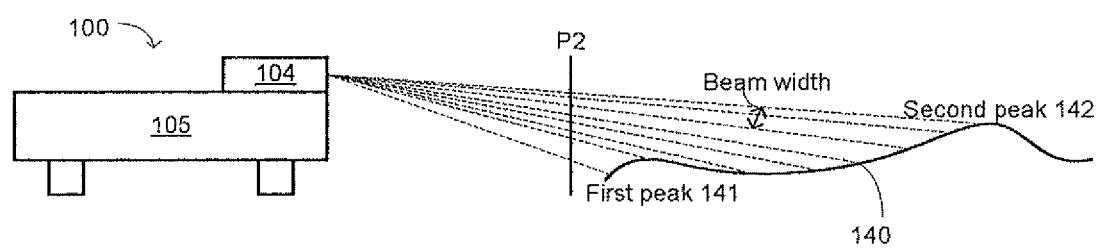
FIG. 5 is a side view of a system, a fence and an area illuminated by the system, according to an embodiment of the invention.

FIG. 5 is a side view of system 100, fence (illustrated as pole P2) and an area (illustrated as a curve 140) illuminated by system 100, according to an embodiment of the invention.

FIG. 5 illustrates a vertical scan of curve 104. Curve 104 includes two peaks—first peak 141 and second peak 142. The first peak is closer to system 100 than the second peak and assuming that both peaks have the same reflection characteristics—an electro-magnetic pulse returned from this second peak will be weaker than an electro-magnetic pulse returned from the first peak. This differences will be taken into account when system 100 generated a simplified representation of curve 140. It is noted that the number of beams can well exceed the number of dashed lines that are illustrate din FIG. 5 and that each beam is defined not by a single dashed line by is rather defined between two non-adjacent dashed lines. The beam is also much wider that fence elements so that it can penetrate beyond the fence elements.

Figure 6:
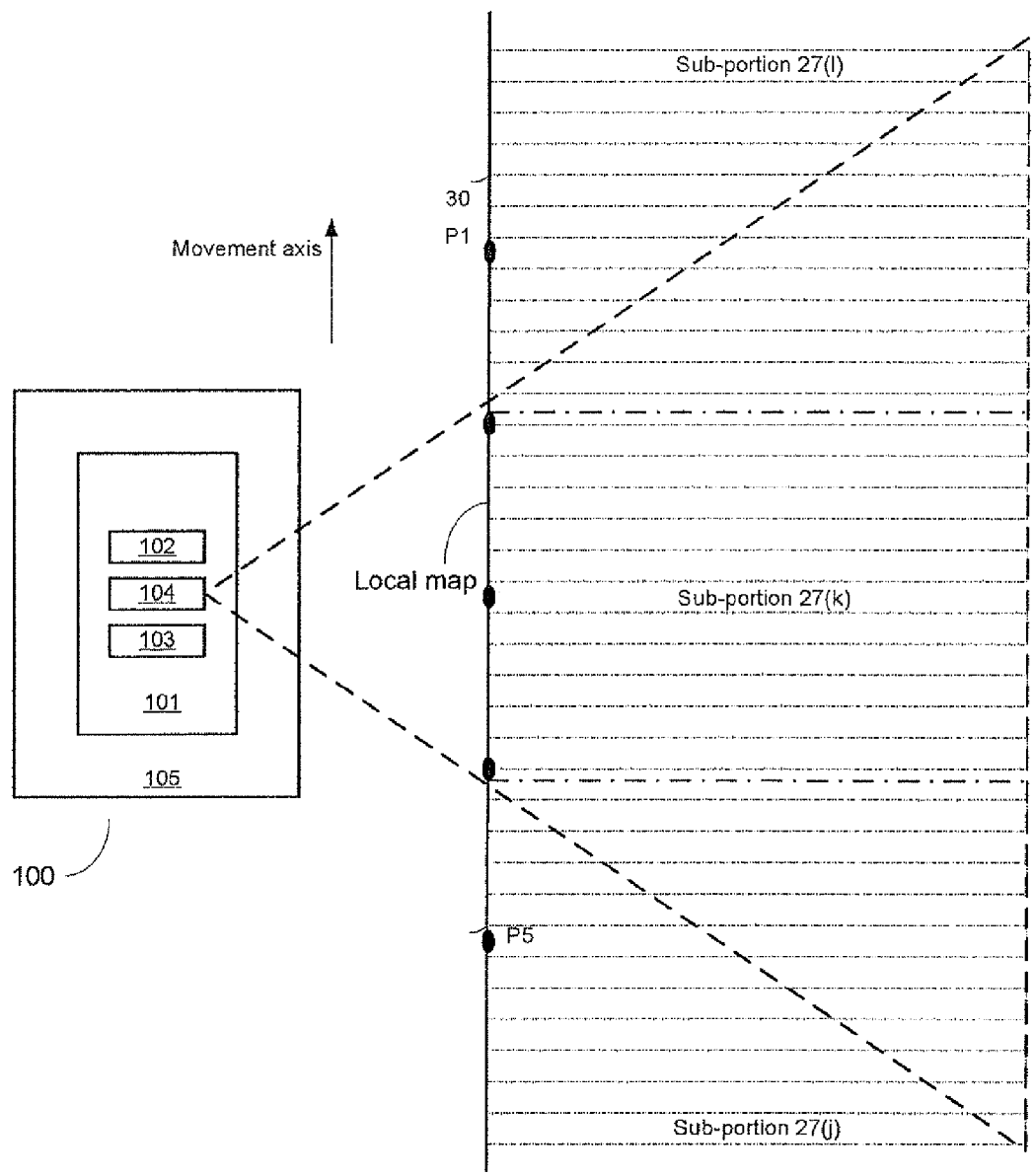
FIGS. 6-7 provide a top view of multiple sub-portions of an illuminated area according to various embodiments of the invention.
Figure 7:
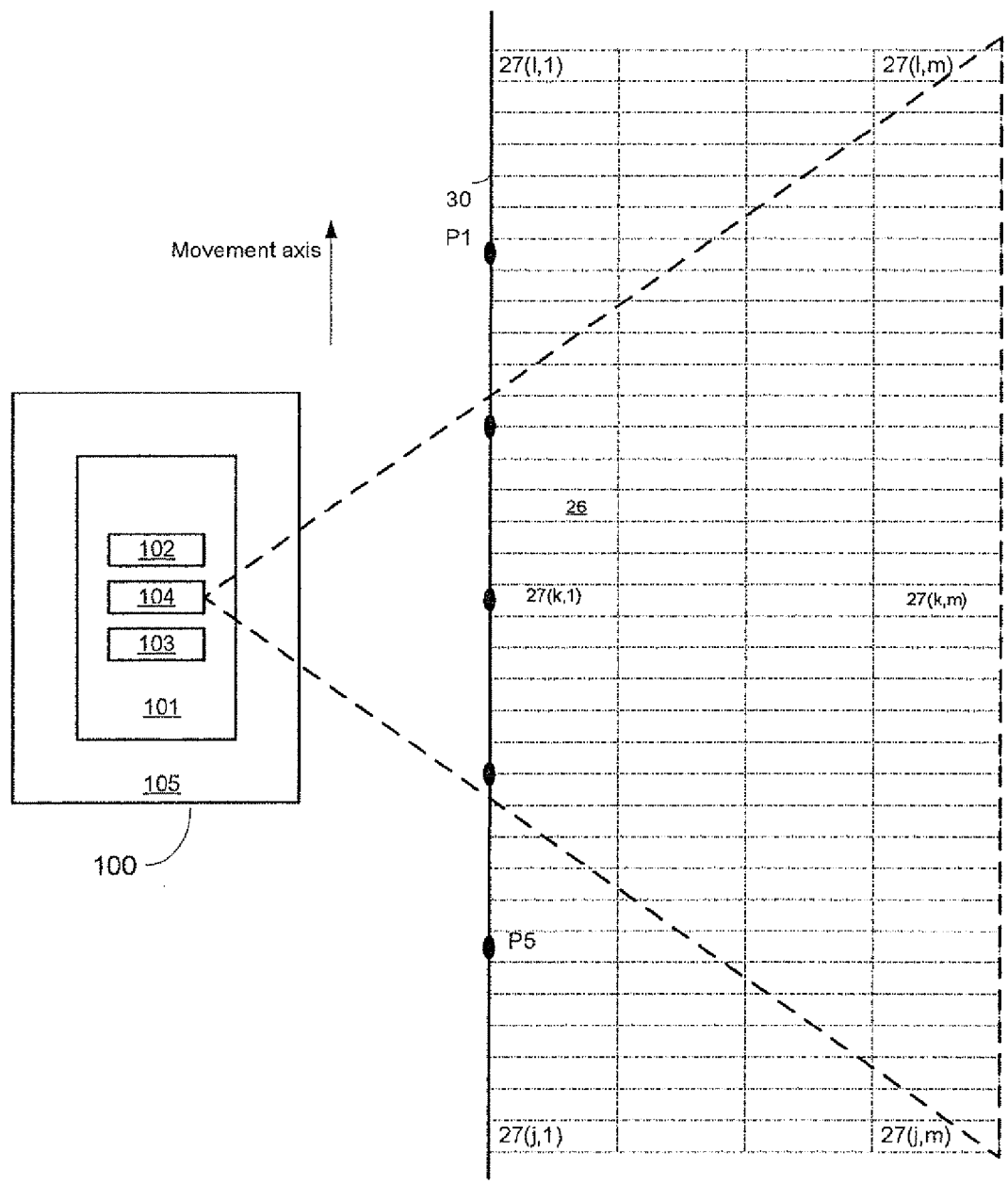

FIGS. 6-7 illustrate multiple sub-portions of an illuminated area according to various embodiments of the invention.

An area portion can be partitioned to multiple sub-portions in various manners. Typically, the size of an area sub-portion is selected to enable fast retrieval and processing of a simplified representation of this area sub-portion.

FIG. 6 illustrates area portion 26 that is split to narrow stripe shaped sub-portions 27(k), 27(j) and 27(l), each area sub-portion will be represented by a simplified representation and with a reference simplified representation. The retrieval of reference simplified representations of area sub-portions are retrieved from memory unit 113 in response to the area-sub-portions that are illuminated by system 100. The location of system 100, the scanning pattern of system 100 and the orientation of system 100 can define which reference sub-portions to retrieve. It is noted that a local map can include only a portion of the Field Of View of system 100. For example, while FIG. 6 illustrates a Field of View can include sub-portions 27(k), 27(k) and 27(l), the local map corresponds to sub-portion 27(k) only. The field of view is defined by a dashed triangle.

FIG. 7 illustrates area portion 26 that is split to a two-dimensional array of sub-portions 27(k,m)-27(j,m), each area sub-portion w (also referred to as tile) will be represented by a simplified representation and with a reference simplified representation. The retrieval of reference simplified representations of area sub-portions are retrieved from memory unit 113 in response to the area-sub-portions that are illuminated by system 100. The location of system 100, the scanning pattern of system 100 and the orientation of system 100 can define which reference sub-portions to retrieve. The separation to sub-portions allows providing continuous feeding of information that is characterized by very high resolution but does require moderate bandwidth (for example—not more than 10 MB/Sec).

FIG. 8 illustrates a spatial and angular relationship between system 100 located at a first measurement point (MP1) and multiple fence poles P2-P5, according to an embodiment of the invention. FIG. 9 illustrates a spatial and angular relationship between system 100 located at first measurement point (MP1) and at a second measurement point (MP2) and multiple fence poles P2-P5, according to an embodiment of the invention. Conveniently, at least three poles/intersections are required at each horizontal.

Figure 8A:
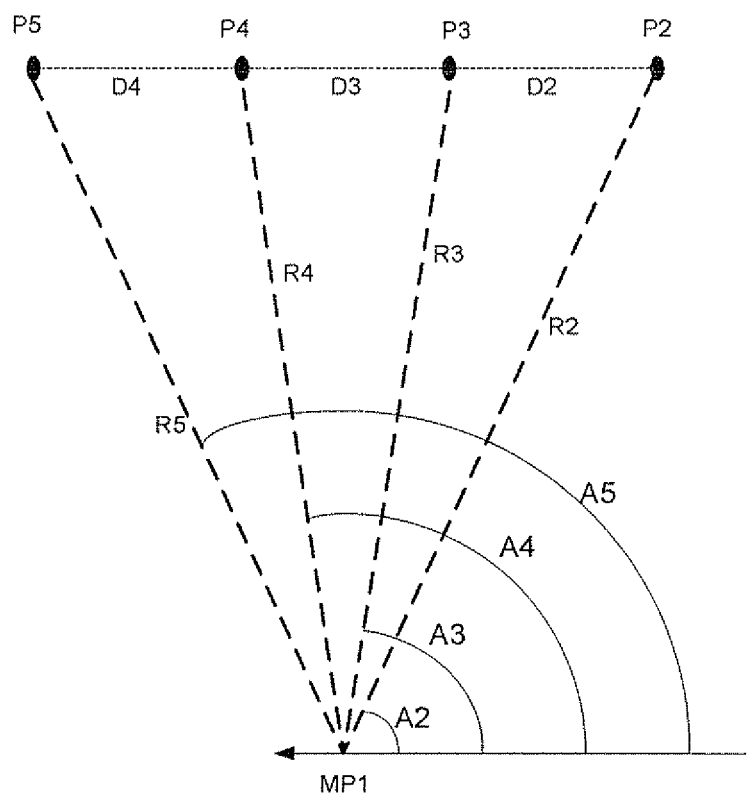
FIGS. 8a and 8b illustrate spatial and angular relationships between a system located at a first measurement point and multiple elements of the structure, according to an embodiment of the invention.
Figure 8B:
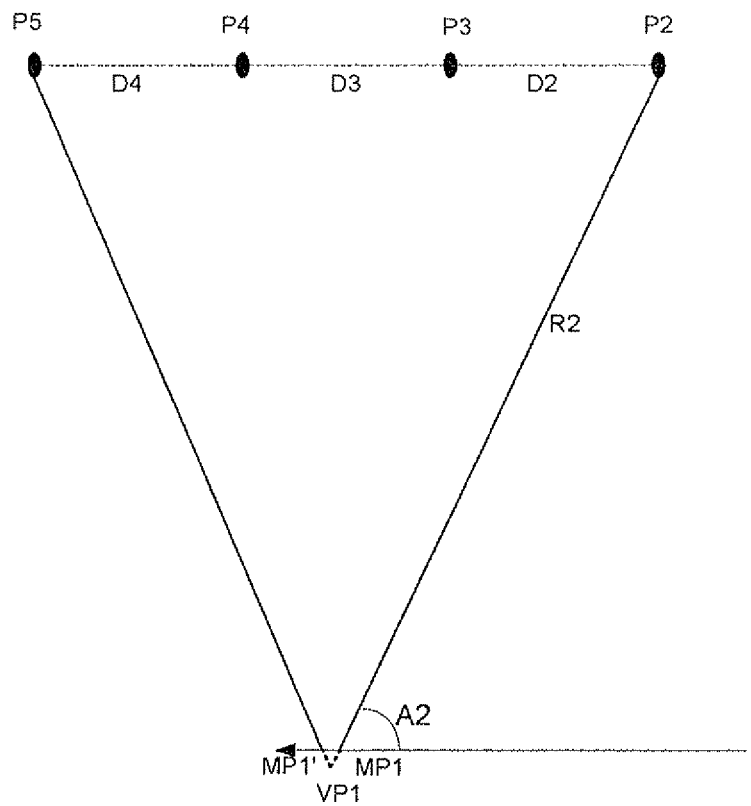
Figure 9:
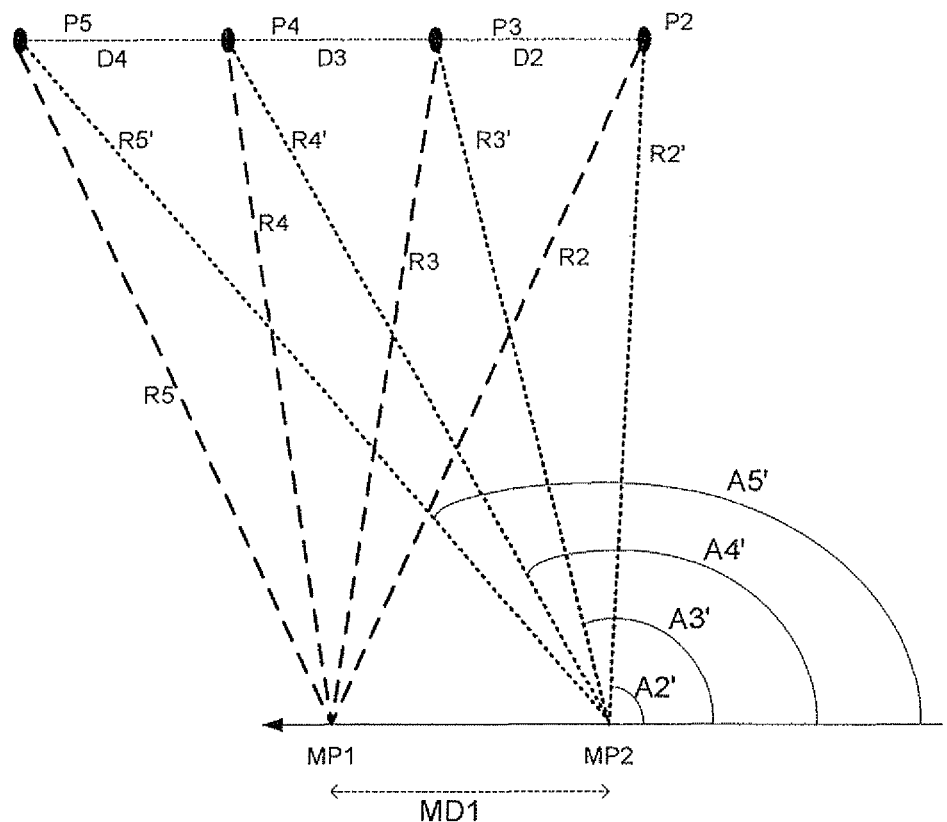
FIG. 9 illustrates a spatial and angular relationship between a system located at a first measurement point and at a second measurement point and multiple elements of the structure, according to an embodiment of the invention.

FIGS. 8a, 8b and 9 will assist in explaining various fence measurement as well as system location determination techniques.

Referring to FIG. 8a, dashed lines R2-R5 represent the distances between MP1 and each poles of poles P2-P5. Curves A2-A5 represent the angle between a system located in MP1 and between each poles of poles P2-P5. D2 represents the approximated or exact distance between poles P2 and P3. D3 represents the approximated or exact distance between poles P3 and P4. D4 represents the approximated or exact distance between poles P4 and 25.

In FIG. 9 second measurement point MP2 is introduced. Dashed lines R2'-R5' represent the distances between MP2 and each poles of poles P2-P5. Curves A2'-A5' represent the angle between a system located in MP2 and between each poles of poles P2-P5. MD1 represents the approximated distance between MP1 and MP2.

It is noted that system 100 typically performs angular as well as other measurements along multiple different horizontal locations of fence 30 (such example at the top of fence 30 and at the bottom of fence 30).

System 100 is adapted to determine its exact location in various optional manners. According to a embodiment of the invention system 100 receives in advance a highly accurate description of fence and is aware of the exact distanced between poles P2-P5. According to another embodiment of the invention system 100 is provided with estimated (or approximated) information relating to the fence and is capable of accurately determining the spatial relationship between poles P2-P5.

According to an embodiment of the invention system 100 is adapted to determine its exact location in response to: (i) a spatial relationship between three substantially vertical elements of the structure portion (for example—exact distances D2-D3 between poles P2-P4), and (ii) measured angles (for example—angles A2-A4) between the system and each of the three substantially vertical elements (such as poles P2-P4) of the structure portion (such as fence portion 36). The three substantially vertical elements are positioned within a field of view of a source of electro-magnetic radiation. This source can be included in second detection unit 103.

According to an embodiment of the invention system 100 is adapted to determine its exact location in response to: (i) a spatial relationship between two substantially vertical elements of the structure portion (for example—exact distance D2 between poles P2-P3), (ii) an approximated distance between two measurement points and each of the two substantially vertical elements (for example—distances R2, R3, R2' and R3'); and (iii) measured angles between the system and each of the two substantially vertical elements of the structure portion (for example—A2, A3, A2' and A3'). The two substantially vertical elements are positioned within a field of view of a source of electro-magnetic radiation.

According to an embodiment of the invention system 100 is adapted to determine its exact location in response to: (i) approximated distance between two measurement points (for example—MD1); (ii) approximated distance between each measurement point and each of three substantially vertical elements of the structure portion (for example R2-R4, R2'-R4'); and (iii) measured angles between the system and each of the three substantially vertical elements of the structure portion ((for example—A2, A3, A4, A2', A3' and A4'). The three substantially vertical elements are positioned within a field of view of a source of electro-magnetic radiation.

According to an embodiment of the invention system 100 is adapted to determine its exact location. By performing a calibration phase that includes generating local maps and then performing a measurement and imaging phase that includes imaging the fence (and object behind the fence) and determining the system's location in relation to the map. The determination of the exact location can be responsive to: (i) approximated distance between laser and structural points; and (ii) exact measured angles between the system and each of the two sets of substantially vertical elements of the structure portion; wherein the angles are measured at each of the three measurement points; wherein the two substantially vertical elements are positioned within a field of view of a source of electro-magnetic radiation.

According to an embodiment of the invention system 100 is adapted to determine the spatial relationship between four substantially vertical elements of the structure portion in response to: (i) a spatial relationship between three out of the four substantially vertical elements of the structure portion (for example—exact distances D2 and D3), and (ii) measured angles between the system and each of the four substantially vertical elements of the structure portion (for example—angles A1-A4). The four substantially vertical elements are positioned within a field of view of a source of electro-magnetic radiation.

According to an embodiment of the invention system 100 is adapted, to determine the spatial relationship between three substantially vertical elements of the structure in response to: (i) an approximated distance between two measurement points (for example MD1); (ii) approximated distances between each measurement point and each of two substantially vertical elements of the structure portion (for example R2-R4, R2'-R4'); and (ii) measured angles between the system and each of the two substantially vertical elements of the structure portion (for example—A2-A4 and A2'-A4'). The two substantially vertical elements are positioned within a field of view of a source of electro-magnetic radiation.

In the mentioned above embodiments the angular measurements are very accurate (tens of micro-radians) and this accuracy can cause the location determination to be very accurate (resolution of about one millimeter). The same applies to the determination of spatial relationships between elements of the structure.

FIG. 8b illustrates multiple poles and a system according to an embodiment of the invention.

The system moves during the measurement process. Thus, assuming a horizontal scan from right to left, pole P2 will be scanned when the system is at a certain location and pole P5 will be scanned when the system is at a slightly different location. Thus, instead of the triangles (for example—MP1, P2, P3) of FIG. 8 there should be a trapezoid that will include MP1 and a slightly shifted (to the left) location MP1'. In order to simplify the calculation the system calculated a virtual point VP1 in which R2 and R5 would have intersected.

The system can estimate its next location. The estimation is based upon the location of the virtual intersection point, the speed of the system and an angle between the system and a pole. It is assumed that an initial location of the system is known as well as an initial speed of the system. The speed of the system and the angle between the system and a reference pole will not substantially change within a short period (for example of few milliseconds). The next location is based upon a look up table (or other data structure) that includes possible angles to different objects along the path. This look up table is calculated (or otherwise generated) in advance and should reflect the angles to various poles along the path assuming various locations of the system. These location can differ from each other by a 1 mm*1 mm, thus reflecting different locations of the system along the path. This look up table virtually converts the path to a two dimensional representation. These angles can be included in a look up table and the exact location of the system can be found by performing auto correlation between the look up table and the measured angles. For example, if the path if 1 Kilometer long and 50 meters wide such a look up table can be a two dimensional matrix of 1,000,000×50,000 elements.

Figure 10:
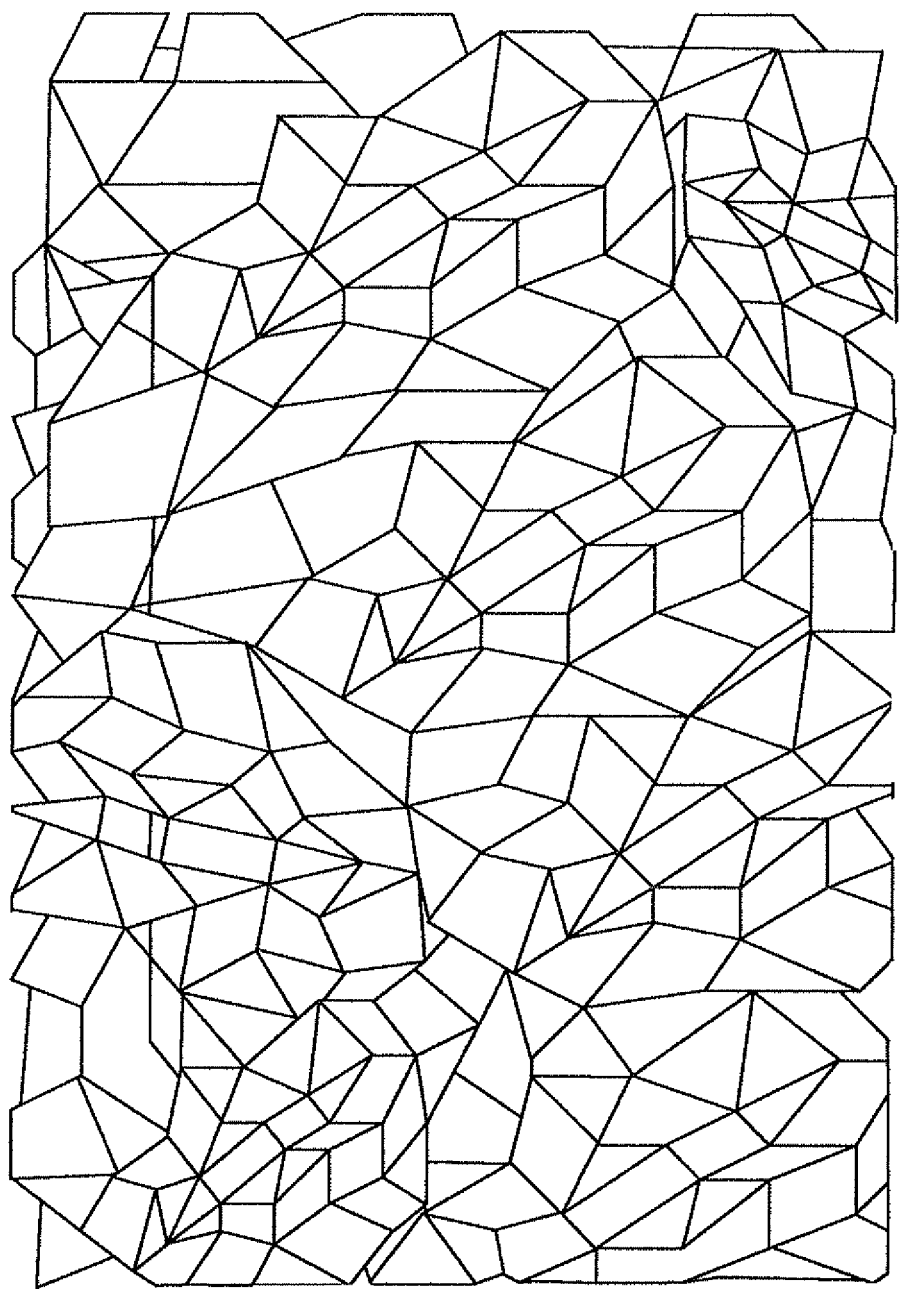
FIG. 10 illustrates a portion of a three dimensional polygon map, according to an embodiment of the invention.
Figure 11:
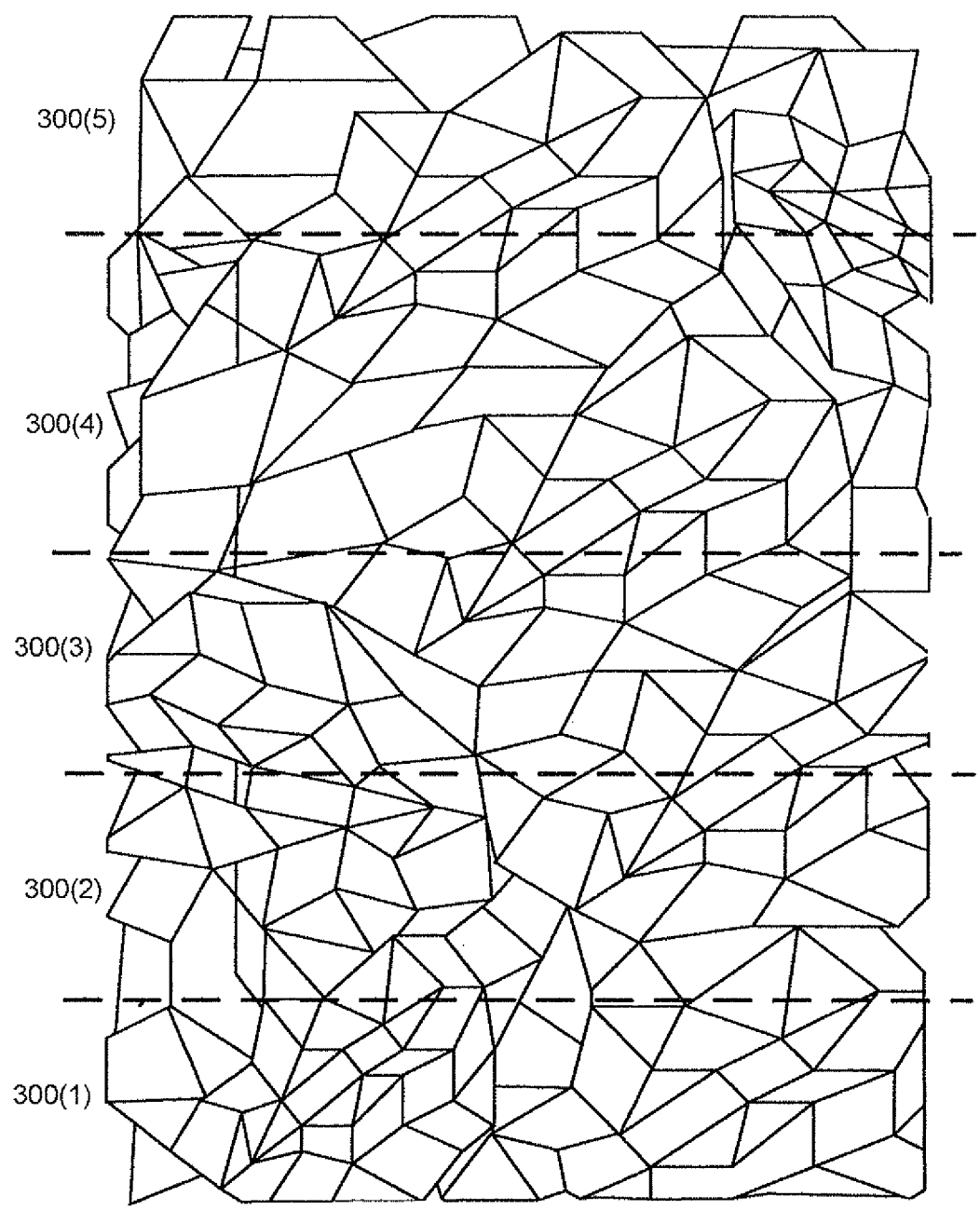
FIG. 11 illustrates multiple sup-portions of a three dimensional polygon map, according to an embodiment of the invention.

FIG. 10 illustrates portion 300 of a three dimensional polygon map, according to an embodiment of the invention and FIG. 11 illustrates multiple sup-portions 300(1)-300(5) of a three dimensional polygon map, according to an embodiment of the invention. The segmentation illustrated in FIG. 11 corresponds to the partition of area portion 26 to long and narrow stripes, as illustrated in FIG. 6. It is noted that other representations of the maps can be used. For example: a cloud of points, a PGM file, an SAR file, or various three dimensional representations.

Figure 12:
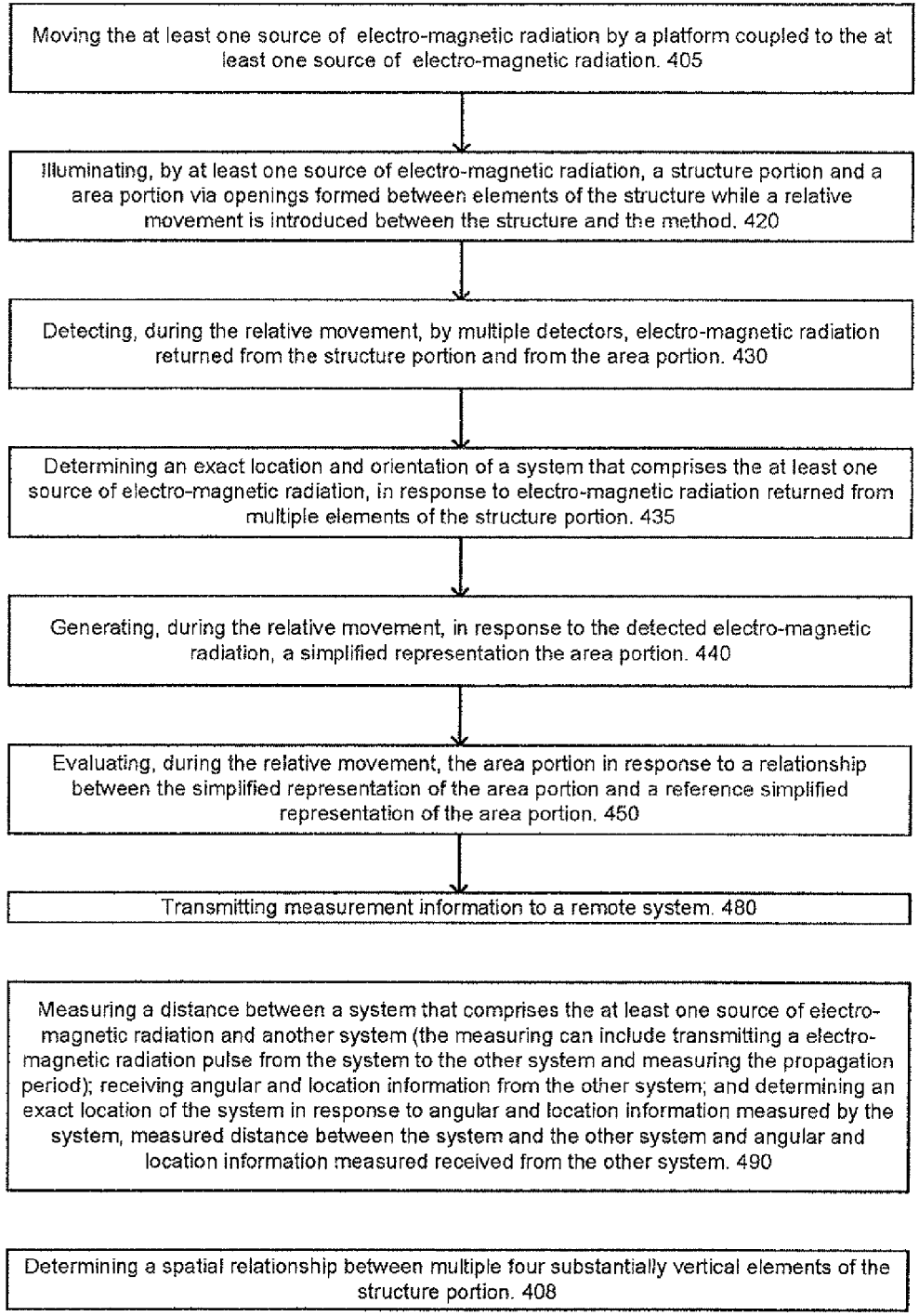
FIG. 12 is a flow chart of a method for evaluating an area according to an embodiment of the invention.

FIG. 12 is a flow chart of method 400 for evaluating an area according to an embodiment of the invention.

Method 400 starts by a preliminary stage such as stages 405 or 408.

Conveniently, method 400 includes Stage 405 of moving the at least one source of electro-magnetic radiation by a platform coupled to the at least one source of electro-magnetic radiation.

According to an embodiment of the invention method 400 includes a preliminary stage 408 of determining a spatial relationship between multiple substantially vertical elements of the structure portion. This stage can be referred to as an initialization stage or a calibration stage. After this stage is completed method 400 can use the spatial relationships between vertical elements of the structure in order to determine the exact location and orientation so the system.

Conveniently, stage 408 includes determining a spatial relationship between three out of the four substantially vertical elements of the structure portion, in response to measured angles between the method and each of the four substantially vertical elements of the structure portion; wherein the four substantially vertical elements are positioned within a field of view of a source of electro-magnetic radiation.

Conveniently, stage 408 includes determining a spatial relationship between two substantially vertical elements of the structure portion in response to: approximated distance between two measurement points; approximated distance between each measurement point and each of two substantially vertical elements of the structure portion; and measured angles between the point and each of the two substantially vertical elements of the structure portion; wherein the angles are measured at each of the two measurement points; wherein the two substantially vertical elements are positioned within a field of view of a source of electro-magnetic radiation.

Conveniently, the determination of stage 408 is characterized by a precision of about one millimeter.

Conveniently, stage 408 includes determining an orientation of the system in response to time of arrival of detected electro-magnetic radiation returned from the structure portion.

Conveniently, stage 408 includes repetitively measuring angles towards structure elements determining of the exact location of the system in response to multiple measurement results.

Stages 408 and 405 are followed by stage 420 of illuminating, by at least one source of electro-magnetic radiation, a structure portion and a area portion via openings formed between elements of the structure while a relative movement is introduced between the structure and the method.

Conveniently, stage 420 of illuminating includes illuminating a structure that comprises elements and openings defined between the elements; wherein the openings are at least one millimeter long.

Conveniently, stage 420 of illuminating includes illuminating a portion of a structure that can be one of the following: a fence, a wired fence, a welded wire fence, a barbed fence, a fence having wires supported by spaced apart posts, a structure having openings covering up to 50% of a structure surface area.

Conveniently, stage 420 of illuminating includes scanning the structure portion along two different scanning directions and illuminating the area portion by a pulsating laser.

Conveniently, stage 420 of illuminating includes vertically scanning the area with elongated radiation beams.

Stage 420 is followed by stage 430 of detecting, during the relative movement, by multiple detectors, electro-magnetic radiation returned from the structure portion and from the area portion.

Stage 430 is followed by stage 435 of determining an exact location and orientation of a system that comprises the at least one source of electro-magnetic radiation, in response to electro-magnetic radiation returned from multiple elements of the structure portion.

Conveniently, stage 435 includes determining of the exact location of the system in response to: a spatial relationship between three substantially vertical elements of the structure portion, and measured angles between the method and each of the three substantially vertical elements of the structure portion; wherein the three substantially vertical elements are positioned within a field of view of a source of electro-magnetic radiation.

Conveniently, stage 435 includes determining of the exact location of the system in response to: a spatial relationship between two substantially vertical elements of the structure portion, approximated distance between two measurement points; and measured angles between the method and each of the two substantially vertical elements of the structure portion; wherein the angles are measured at each of the two measurement points; wherein the two substantially vertical elements are positioned within a field of view of a source of electro-magnetic radiation. It is noted that the measurement is fast enough to measure sudden jumps so that information is not lost due to these sudden jumps. It is noted that the exact location of the system can be determined in other manners, as mentioned above. Especially, exact location can be determined by one point and three poles.

Conveniently, stage 435 includes determining of the exact location of the system in response to: approximated distance between two measurement points; approximated distance between each measurement point and each of three substantially vertical elements of the structure portion; and measured angles between the method and each of the three substantially vertical elements of the structure portion; wherein the angles are measured at each of the two measurement points; wherein the three substantially vertical elements are positioned within a field of view of a source of electro-magnetic radiation.

Conveniently, stage 435 includes determining of the exact location of the system in response to: approximated distance between three measurement points; approximated distance between each measurement point and each of two substantially vertical elements of the structure portion; and measured angles between the method and each of the two substantially vertical elements of the structure portion; wherein the angles are measured at each of the three measurement points; wherein the two substantially vertical elements are positioned within a field of view of a source of electro-magnetic radiation.

Stage 435 is followed by stage 440 of generating, during the relative movement, in response to the detected electro-magnetic radiation, a simplified representation the area portion.

Conveniently stage 440 includes generating a simplified representation of the area portion that comprises a three dimensional polygonal map of the area.

Conveniently, stage 440 of generating includes generating multiple simplified representations of sub-portions of the area. Stage 450 can include evaluating each area sub-portion in response to a relationship between the simplified representation of the area sub-portion and a reference simplified representation of the area sub-portion.

Conveniently, stage 440 includes generating a simplified representation of the area portion in response to an intensity and time of arrival of multiple radiation pulses returned from the portion of the area. Conveniently, the intensity of receives electro-magnetic pulses is amplified in response to their distance from the illuminating system.

Conveniently, stage 440 includes retrieving a reference simplified representation of a area sub-portion in response to the exact location of the system and wherein the generating comprises generating a simplified representation of the area sub-portion in response to the orientation of the system.

Stage 440 is followed by stage 450 of evaluating, during the relative movement, the area portion in response to a relationship between the simplified representation of the area portion and a reference simplified representation of the area portion.

It is noted that various stages of method 400 can be executed simultaneously and/or in a pipelined manner. For example, while a certain structure element is illuminated information relating to another element of the structure can be processed. Yet for another example, especially where exact location information is determined by measuring angular information from multiple measurement points, information can be initially processes at a certain measurement point and then updated or re-evaluated at another measurement point. Yet for a further example, multiple iterations of substantially the same angular measurements can be performed in order to improve the accuracy of the location as well as the orientation determination.

Conveniently, method 400 includes stage 480 of transmitting measurement information to a remote system.

Conveniently, method 400 can be executed in a fully automated manner but it can also receive instructions provided by an operator.

According to an embodiment of the invention method 400 include stage 490 of measuring a distance between a system that comprises the at least one source of electro-magnetic radiation and another system (the measuring can include transmitting a electro-magnetic radiation pulse from the system to the other system and measuring the propagation period); receiving angular and location information from the other system; and determining an exact location of the system in response to angular and location information measured by the system, measured distance between the system and the other system and angular and location information measured received from the other system. Stage 490 can assist in determining the exact location of the system, and can replace various measurements from multiple measurement points.

It is noted that various stages of method 400 could be carried out in an iterative manner, per area portion or per area sub-portion, during the motion of system 100 along structure such as fence 30. According to an embodiment of the invention, there are provided predefined verification rules, for assessing various alteration indications. The verification rules may be applied in a fully automated, fully manned or semi-automated operation. The verification rules are applied by analyzing occurrence data associated with different segments.

In the above description, the invention is described mainly with reference to detection of alterations in a fence—which is a continuous structure. It should be understood that the invention is not limited to continuous structures. The principles of the present invention are useful for detecting an alteration in a succession of discrete structure portions.

The invention claimed is:

1. A system for evaluating an area portion located behind a structure having one or more openings formed between elements of the structure, the system comprising:
    one or more sources of electro-magnetic radiation adapted to illuminate a portion of the structure and/or to illuminate the area portion via one or more openings while a relative movement is introduced between the structure and the system;
    multiple non-coherent detectors adapted to detect electro-magnetic radiation returned from the portion of the structure and/or from the area portion behind the structure;
    a computing unit adapted to:

determine, in response to measured electro-magnetic radiation returned from the portion of the structure, an exact location and orientation of the system relative to the structure;

retrieve a reference simplified representation of the area portion behind the structure, said reference simplified representation corresponding to the determined exact relative location and/or orientation of the system, thus giving rise to a corresponding reference simplified representation;

generate a simplified representation of said area portion behind the structure, said simplified representation corresponding to the determined relative exact location and/or orientation of the system and indicative of measured intensity and time of arrival of multiple radiation pulses returned from the area portion; and evaluate said area portion behind the structure by comparing said simplified representation of said area portion and said corresponding reference simplified representation of said area portion, wherein differences between said representations are indicative of one or more changes in said area portion.

2. The system of claim 1 further comprising a compensation unit adapted to compensate a difference between a process of acquisitioning said simplified representation and a process of pre-acquisitioning said corresponding reference simplified representations, said compensation to be used when evaluating the area portion behind the structure.

3. The system of claim 1 wherein the computer unit is adapted to generate the simplified representation of the area portion that comprises a three dimensional polygonal map of the area.

4. The system of claim 1 wherein the computing unit is adapted to determine the exact relative location of the system with the help of a combination of at least two elements selected from a group comprising:

a spatial relationship between two or more substantially vertical elements of the structure portion involved in the measurement, wherein the substantially vertical elements involved in the measurement are positioned within a field of view of respective sources of electro-magnetic radiation;

measured angles between the system and each of substantially vertical elements of the structure portion involved in the measurements;

approximated distance between respective measurement points; and approximated distance between each measurement point and each of substantially vertical elements of the structure portion involved in the measurement.

5. The system of claim 1 wherein the computing unit is adapted to determine the relative orientation of the system in response to time of arrival of detected electro-magnetic radiation returned from the portion of the structure.

6. The system of claim 1 wherein said one or more sources of electro-magnetic radiation and said multiple detectors are arranged in at least two non-coherent detection units, each non-coherent detection unit comprising at least one source of electro-magnetic radiation and at least one non-coherent detector, the non-coherent detection units are adapted to scan the portion of the structure along two different scanning directions, the system further comprising a third detection unit comprising at least one source of electromagnetic radiation and at least one detector and adapted to scan the area portion behind the structure.

7. The system of claim 6 wherein the third detection unit comprises a coherent pulsating laser that generates high repetition rate pulses.

8. The system of claim 6 wherein the third detection unit comprises a non-coherent laser.

9. The system of claim 1 wherein the structure is selected from a group comprising: a fence, a wired fence, a welded wire fence, a barbed fence, a fence having wires supported by spaced apart posts, and a structure having openings covering up to 50% of the surface area.

10. A method of evaluating an area portion located behind a structure having one or more openings formed between elements of the structure, the method comprising:

(a) illuminating, by one or more sources of electro-magnetic radiation, a portion of the structure and the area portion via openings during a relative movement between the structure and the sources of electro-magnetic radiation;

(b) during a relative movement detecting, by multiple non-coherent detectors arranged in connection with said sources, electro-magnetic radiation returned from the portion of the structure and from the area portion;

(c) determining an exact location and orientation of the sources and the detectors relative to the structure by analyzing electro-magnetic radiation returned from the portion of the structure;

(d) retrieving a reference simplified representation of the area portion behind the structure, said reference simplified representation corresponding to the determined relative exact location and/or orientation of the system, thus giving rise to a corresponding reference simplified representation;

(e) generating a simplified representation of said area portion behind the structure, said simplified representation corresponding to the determined relative exact location and/or orientation of the system and indicative of measured intensity and time of arrival of multiple radiation pulses returned from the area portion; and (f) evaluating said area portion behind the structure by comparing said simplified representation of said area portion and said corresponding reference simplified representation of said area portion, wherein differences between said representations are indicative of one or more changes in said area portion.

11. The method of claim 10 further comprising compensating a difference between a process of acquisitioning said simplified representation and a process of pre-acquisitioning said corresponding reference simplified representations, said compensation to be used when evaluating the area portion behind the structure.

12. The method of claim 10 further comprising transmitting results of operation b) to a remote system, wherein at least one of the operations c)-f) is provided by said remote system.

13. The method of claim 10 wherein the exact relative location of the system is determined with the help of a combination of at least two elements selected from a group comprising:

a spatial relationship between two or more substantially vertical elements of the structure portion involved in the measurement, wherein the substantially vertical elements involved in the measurement are positioned within a field of view of respective sources of electro-magnetic radiation;

measured angles between the system and each of substantially vertical elements of the structure portion involved in the measurements;

approximated distance between respective measurement points; and approximated distance between each measurement point and each of substantially vertical elements of the structure portion involved in the measurement.

14. The method of claim 10 wherein the relative orientation of the system is determined in accordance with measured time of arrival of detected electro-magnetic radiation returned from the portion of the structure.

15. The method of claim 10 wherein said one or more sources of electro-magnetic radiation and said multiple detectors are arranged in at least two non-coherent detection units, each non-coherent detection unit comprising at least one source of electro-magnetic radiation and at least one non-coherent detector, the method further comprising scanning the portion of the structure along two different scanning directions with the help of a first and a second non-coherent detection units, and scanning the area portion behind the structure with the help of a third detection unit comprising at least one source of electro-magnetic radiation and at least one detector.

16. The method of claim 15 wherein the third detection unit comprises a coherent pulsating laser that generates high repetition rate pulses.

17. The method of claim 15 wherein the third detection unit comprises a non-coherent laser.

18. The method of claim 10 wherein the structure is selected from a group comprising: a fence, a wired fence, a welded wire fence, a barbed fence, a fence having wires supported by spaced apart posts, and a structure having openings covering up to 50% of the surface area.

19. A computer program product embodied on a non-transitory computer readable medium comprising computer program code means for performing, when said program is run on a computer, evaluating an area portion located behind a structure having one or more openings formed between elements of the structure, the evaluating comprising:

(a) enabling, by one or more sources of electro-magnetic radiation, illuminating a portion of the structure and the area portion via openings during a relative movement is introduced between the structure and the sources of electro-magnetic radiation;

(b) enabling detecting, by multiple non-coherent detectors arranged in connection with said sources, electro-magnetic radiation returned from the portion of the structure and from the area portion;

(c) determining an exact location and orientation of sources and detectors relative to the structure by analyzing electro-magnetic radiation returned from the portion of the structure;

(d) retrieving a reference simplified representation of the area portion behind the structure, said reference simplified representation corresponding to determined exact relative location and/or orientation of the system, thus giving rise to a corresponding reference simplified representation;

(e) generating a simplified representation of said area portion behind the structure, said simplified representation corresponding to the determined exact relative location and/or orientation of the system and indicative of intensity and time of arrival of measured multiple radiation pulses returned from the area portion; and (f) evaluating said area portion behind the structure by comparing said simplified representation of said area portion and said corresponding reference simplified representation of said area portion, wherein differences between said representations are indicative of one or more changes in said area portion.

* * * * *